(No Model.)
P. F. TURNER.
BALL BEARING.
No. 567,013.  Patented Sept. 1, 1896.
Fig: 1.
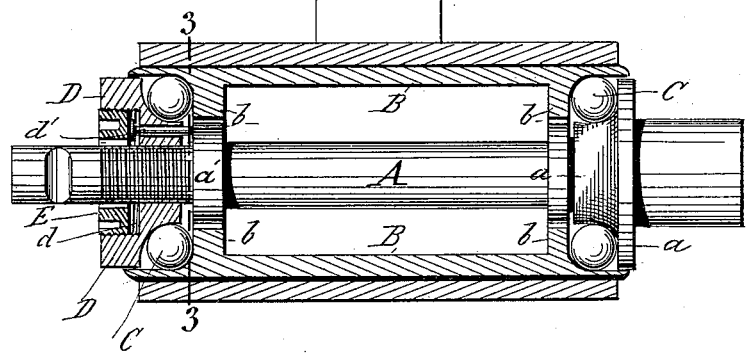
Fig: 2.
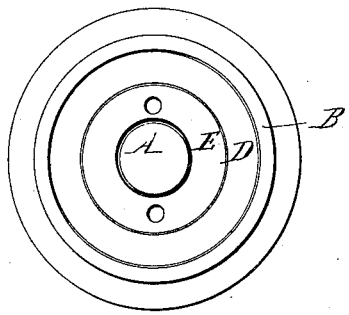
Fig: 3.
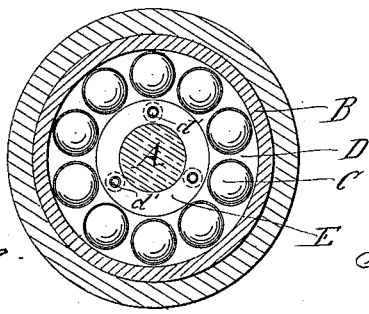
WITNESSES:
Alfred Ginsberg
Chas Doehring
INVENTOR
Peter F. Turner
BY Charles Katz
ATTORNEY.

UNITED STATES PATENT OFFICE.

PETER F. TURNER, OF NEW YORK, N. Y.

BALL-BEARING.

SPECIFICATION forming part of Letters Patent No. 567,013, dated September 1, 1896.

Application filed April 14, 1896. Serial No. 587,486. (No model.)

*To all whom it may concern:*

Be it known that I, PETER F. TURNER, a citizen of the United States, and a resident of New York, in the county of New York and State of New York, have invented certain new and useful Improvements in Ball-Bearings, of which the following is a specification.

My invention has reference to improvements in ball-bearings; and it consists of a bearing provided with an attachment by means of which a correct contact of the balls and the surfaces of the ball-chambers is secured, and after these surfaces are worked out by the rolling action of the balls the said contact can be easily and reliably adjusted, so that a permanent exact working of the bearing is obtained. This object is attained by the construction shown in the accompanying drawings, in which—

Figure 1 is a longitudinal section, and Fig. 2 an end view, of the same. Fig. 3 is a section on line 3 3 of Fig. 1.

Similar letters of reference indicate corresponding parts.

A in the drawings represents the shaft of the bearing, which on one end has a curved or conical head $a$ and on the other end an annular flange $a'$, and B is a sleeve having at both ends inwardly-extending flanges $b$. The outer portions of the flanges are curved or conical. Through the end openings of the sleeve formed by the said flanges $b$ the shaft A is pushed, so that the same may revolve in the sleeve or the latter may be rotated on the shaft.

D is a screw-nut, the inner thread of which corresponds with a thread on the shaft, so that when the screw-nut is placed over the threaded end of the shaft and screwed upon the same the sleeve B is located between the said screw-nut and the head of the shaft, the flange $a'$ of the shaft being in line or nearly in line with the respective flange $b$ of the sleeve. The inner portion of the outer surface of the screw-nut is also curved or conical, so that by the screw-nut and one flange $b$ and by the shaft-head $a$ and the other flange $b$ of the sleeve annular chambers are formed which contain series of balls C, as usual in ball-bearings. The top portion of the screw-nut D is provided with a circular excavation $d$, having a threaded side wall and two or more perforations reaching from the bottom of the excavation to the end of the screw-nut. Into these perforations pins $d'$ are loosely placed, and a set-screw E is screwed into the excavation of the screw-nut D, by which set-screw the pins $d'$ are pushed forward upon the flange $a'$ of the shaft. The set-screw of course must be provided with a center hole through which the shaft passes, as illustrated on the drawings.

When the balls C are placed into the annular chambers around the shaft A, which chambers are formed by the head $a$ and the screw-nut D, respectively, with the flanges $b$ of the sleeve B, as said before, the inner ends of the pins $d'$ will rest on the flange $a'$ of the shaft A. The object of these pins is to regulate the contact of the balls with the walls of the ball-chambers and obtain thereby an easy revolution of the shaft or the sleeve with the least possible friction. To attain this purpose, the length of the portions of the pins $d'$ which have to project through the perforations of the screw-nut D are first found out and then the set-screw E screwed deep enough into the screw-nut D so that when the pins $d'$, which all are of a like size, are touched by the said set-screw E and the screw-nut D is screwed upon the shaft until the ends of the pins $d'$ reach the flange $a'$, the required contacts of the balls with the walls of the ball-chamber are obtained. Should the walls of the ball-chambers press too closely upon the balls, the screw-nut D is turned back and the pins $d'$ are pushed forward by screwing the set-screw E farther into the screw-nut D, whereby the spaces of the ball-chambers are enlarged. When, after a certain time of use, the walls of the ball-chambers are worn out by the rolling action of the balls and the exact contact of the balls with the said walls is disturbed, the set-screw E is turned back and the screw-nut D screwed farther upon the shaft until the required contact is obtained, and then the set-screw E is screwed into the screw-nut D until the pins $d'$ press upon the flange $a$ of the shaft, whereby the required contact is fixed again. When the shaft, for any purpose, should be removed from the sleeve and again be attached to the same, a further adjustment of the ball-chambers is not necessary, as the required distance between the walls of the ball-chambers and the balls has been fixed before by the pins $d'$ and the set-screw E, as described.

Having thus described my invention, I claim as new and desire to secure by Letters Patent—

1. In a ball-bearing having the ball-chambers formed by a head of the shaft on one end and a screw-nut on the other end of the shaft and inwardly-extending flanges of a sleeve, which incloses the shaft, an annular flange fixed upon the shaft, adjustable pins projecting through the screw-nut upon the flange, and a device by which said pins are kept in position in the said flange, substantially as and for the purpose set forth.

2. In a ball-bearing having the ball-chambers formed by a head of the shaft on one end and a screw-nut on the other end of the shaft and inwardly-extending flanges of a sleeve which incloses the shaft, an annular flange fixed upon the shaft, adjustable pins projecting through the screw-nut upon the said flange, and a set-screw sunk and screwed into the said screw-nut upon the heads of the said pins to hold them in position, substantially as set forth.

Signed at New York, in the county of New York and State of New York, this 4th day of April, A. D. 1896.

PETER F. TURNER.

Witnesses:
M. W. WENTWORTH,
M. F. O'CONNOR.